United States Patent
Barillari et al.

(10) Patent No.: US 7,810,098 B2
(45) Date of Patent: Oct. 5, 2010

(54) ALLOCATING RESOURCES ACROSS MULTIPLE NODES IN A HIERARCHICAL DATA PROCESSING SYSTEM ACCORDING TO A DECENTRALIZED POLICY

(75) Inventors: Fabio Barillari, Syracuse (IT); Fabio Benedetti, Rome (IT); Pietro Iannucci, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1626 days.

(21) Appl. No.: 11/044,604

(22) Filed: Jan. 27, 2005

(65) Prior Publication Data

US 2005/0235289 A1  Oct. 20, 2005

(30) Foreign Application Priority Data

Mar. 31, 2004  (EP) ................................. 04368023

(51) Int. Cl.
*G06F 9/46* (2006.01)
*G06F 15/173* (2006.01)
(52) U.S. Cl. .................. 718/104; 718/100; 709/226
(58) Field of Classification Search .......... 718/100, 718/102, 104; 709/226
See application file for complete search history.

(56) References Cited

U.S. PATENT DOCUMENTS

| | | | |
|---|---|---|---|
| 5,682,530 A * | 10/1997 | Shimamura | 718/104 |
| 5,889,956 A * | 3/1999 | Hauser et al. | 709/226 |
| 6,353,898 B1 * | 3/2002 | Wipfel et al. | 714/48 |
| 6,457,065 B1 * | 9/2002 | Rich et al. | 719/328 |
| 6,715,097 B1 * | 3/2004 | Kidder et al. | 714/2 |
| 6,725,456 B1 * | 4/2004 | Bruno et al. | 718/102 |
| 6,748,470 B2 * | 6/2004 | Goldick | 710/200 |

* cited by examiner

*Primary Examiner*—Meng-Ai An
*Assistant Examiner*—Tammy Lee
(74) *Attorney, Agent, or Firm*—Garg Law Firm, PLLC; Rakesh Garg; Jeffrey S. LaBaw (57) ABSTRACT

A method (300) and a corresponding system for allocating resources in a hierarchical data processing system are proposed. The system includes a plurality of nodes that are arranged in a tree. Each leaf-node, or client, controls corresponding local resources, while each intermediate node, or domain manager, controls global resources that are visible to all its dependent nodes; the global resources defined on a root node, or master domain manager, are then visible to all the nodes of the system. Whenever a job, being submitted (306) on a generic client, requests a set of resources for its execution, the request is sent (309,318,327) through the tree to the master domain manager. The master domain manager allocates (339) the corresponding global resources as soon as they are all available; this event enables (345) its child node (in a path to the client) to perform the same operations, and so on down to the client itself. Once the client has allocated (357) the corresponding local resources, the execution of the job can be launched (360).

20 Claims, 8 Drawing Sheets

ALLOCATING RESOURCES ACROSS MULTIPLE NODES IN A HIERARCHICAL DATA PROCESSING SYSTEM ACCORDING TO A DECENTRALIZED POLICY

TECHNICAL FIELD

The present invention relates to the data processing field, and more specifically to a method for allocating resources in a hierarchical data processing system.

BACKGROUND ART

A data processing system provides several hardware and/or software resources, which are used to perform different operations (or tasks). Whenever the resources are shared among multiple tasks competing for their access, the data processing system must include a resource manager that controls their allocation correctly. Particularly, the resource manager grants access to the resources according to corresponding constraints (such as in mutual exclusion); moreover, the resource manager prevents, or at least detects, any critical condition in the system (such as a deadlock, a livelock or a starvation). For example, a deadlock can arise when two tasks require a pair of resources at the same time; in this case, it is possible that a first task be granted access to a first resource and a second task be granted access to a second resource; therefore, the first task waits for the second task to release the second resource and the second task waits for the first task to release the first resource. As a consequence, no task can proceed (unless one of them is preempted).

The complexity of the above-described activity is strongly increased in a data processing system with distributed architecture. Indeed, in this case each task running on a specific computer of the system can access resources that are dispersed across the system on different computers. A typical example is that of a hierarchical system, wherein the computers are organized into a tree; in this case, each task running on a generic node of the tree is allowed to access any resource that is defined in a path between the node itself and a root of the tree.

A solution known in the art for controlling the allocation of resources in a distributed system (and especially in a hierarchical system) consists of providing a central resource manager for the whole system. Whenever a task needs a set of resources for its execution, a corresponding request is transmitted to the central resource manager. The central resource manager controls all the resources of the system; therefore, each resource is allocated to the requesting task as soon as it is available.

A drawback of the above-described architecture is that the central resource manager is a bottleneck for the performance of the system (since all the requests must be processed by this component).

Particularly, any failure of the central resource manager prevents the allocation of every resource, thereby impairing operation of the whole system.

The known structure also involves a high traffic of messages between the different nodes of the system and the central resource manager (since the access to each resource is granted individually); this results in an overhead of a corresponding communication infrastructure.

Moreover, the central resource manager must implement complex algorithms for preventing (or detecting) possible critical conditions in the system.

SUMMARY OF THE INVENTION

It is an object of the present invention to provide a method that manages allocation of the resources in a hierarchical data processing system according to a decentralized policy.

Particularly, it is an object of the present invention to distribute the workload relating to the allocation of the resources across multiple nodes.

It is another object of the present invention to increase the fault tolerance of the system.

It is yet another object of the present invention to reduce the overhead of the corresponding communication infrastructure.

More specifically, it is an object of the present invention to simplify the prevention of any critical condition in the system.

The accomplishment of these and other related objects is achieved by the solution set out in the independent claims.

Briefly, an aspect of the present invention provides a method of allocating resources in a hierarchical data processing system including a plurality of nodes arranged in a tree, each resource being controlled by a corresponding node, wherein the method includes the steps of: submitting a request of execution of an operation requiring a set of selected resources, each selected resource being controlled by a node in an ordered path, and enabling execution of the operation in response to the allocation of all the selected resources, the selected resources controlled by each node in the path being allocated only when all the selected resources controlled by each previous node in the path have been allocated.

The present invention also provides a computer program for performing the method and a computer program for running on each node of the system, together with corresponding products embodying the programs.

Moreover, a corresponding system for allocating resources in a hierarchical data processing system is also encompassed.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION OF THE PREFERRED EMBODIMENT(S)

Figure 1A:
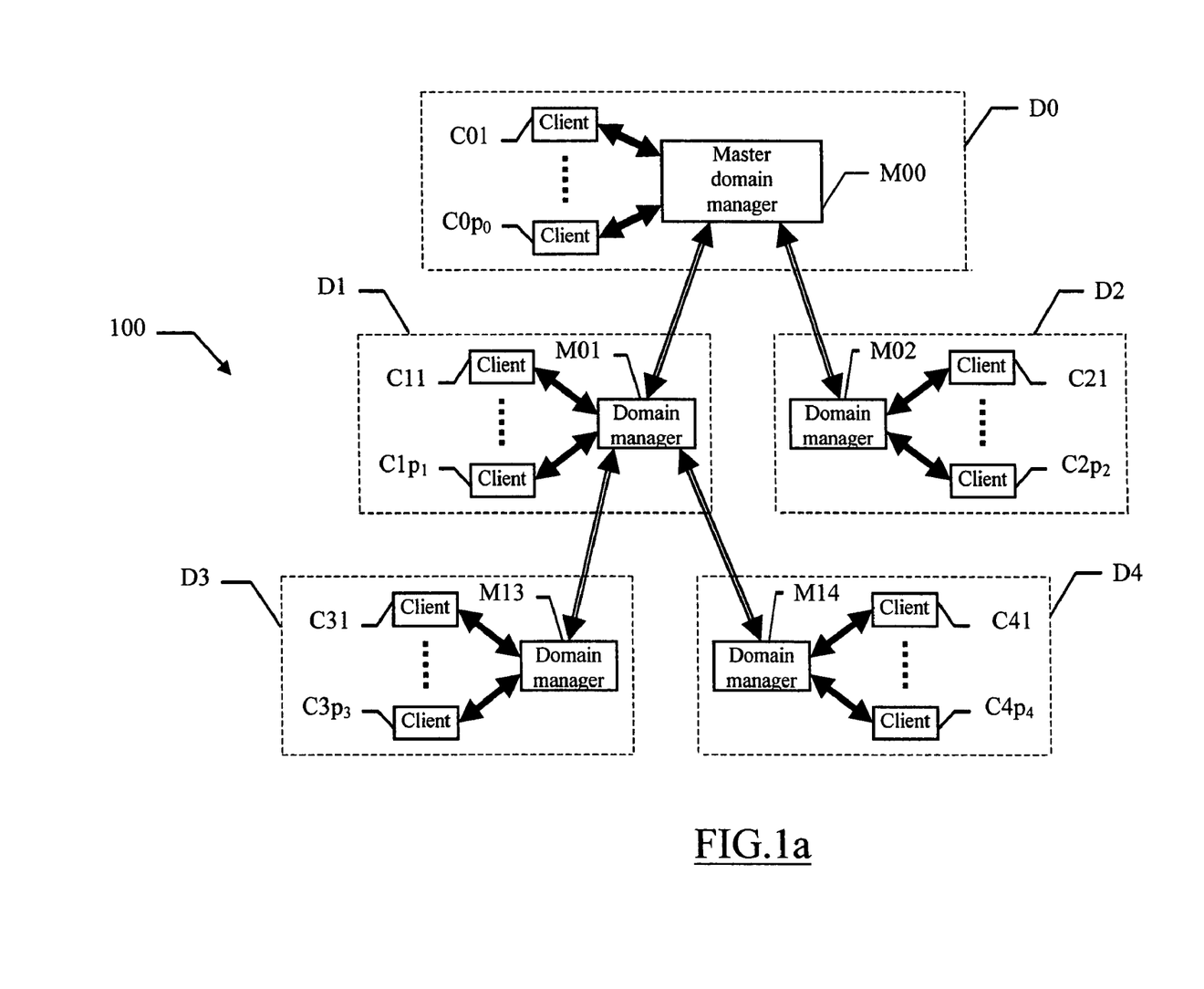
FIG. 1*a* is a schematic block diagram of a data processing system in which the method of the invention is applicable.

With reference in particular to FIG. 1*a*, a data processing system 100 with distributed architecture (typically INTER- NET-based) is shown. The system 100 includes a plurality of computers, which are arranged into a hierarchical structure. For this purpose, the computers are logically organized into a tree, with each computer that defines a corresponding node.

Particularly, a node M00 defines a root of the tree. One or more intermediate nodes (denoted with M0$h$, where $h=1, \ldots, d_1$) depend on the root node M00. In turn, each intermediate node M0$h$ may have one or more dependent intermediate nodes (denoted with Mhk, where $k=d_1+1, \ldots, d_2$), and so on. Therefore, if the tree has n levels a generic (non-leaf) node can be identified as Mxy (where the index $y=1, \ldots, d_n$ is a progressive number denoting the node and the index x specifies its parent node, with x=0 for the root node). Each node Mxy may have one or more dependent leaf nodes (denoted with Cyi, where $i=0, \ldots, p_y$). The node Mxy controls a domain Dy, which consists of the node Mxy itself (called domain manager) and the nodes Cyi (called clients) that are directly dependent thereon; the root node M00 (controlling the domain D0) is also called master domain manager.

The system 100 exploits different physical or logical (hardware/software) resources, such as communication lines, printers, databases, files, software facilities, and the like. Each resource is controlled by a corresponding node (irrespective of its actual location). The resource may be either local or global. A local resource is controlled by a client Cyi; the local resource is only visible to the corresponding client Cyi. Conversely, a global resource is controlled by a domain manager Mxy; the global resource is visible to the corresponding domain manager Mxy, to the clients Cyi of its domain Dy, and to the odes of the dependent domains. Therefore, the (global) resources controlled by the master domain manager D00 are visible to all the nodes of the system 100. As a consequence, each client Cyi is allowed to access its local resources and the global resources that are controlled by any node in a path between the client Cyi and the master domain manager M00.

In the example shown in the figure, the system 100 includes a domain D0 that is controlled by the master domain manager M00; two domains D1 and D2 (controlled by the domain managers M01 and M02, respectively) depend on the domain D0, and in turn two further domains D3 and D4 (controlled by the domain managers M13 and M14, respectively) depend on the domain D1. For example, the clients C3$i$ in the domain D3 consist of computers that are installed in a specific European country (each one controlling associated local resources, such as site databases); the corresponding domain manager M13 controls the resources that are common to all the clients C3$i$ (for example, country databases). Likewise, the domain D4 relates to resources for clients C4$i$ that are installed in another European country. The domain D1 in turn provides resources that are common for all the European countries (such as regional databases), while the domain D2 provides resources for all the American countries. At the end, the master domain manager M00 in the domain D0 controls resources that must be available to every country (such as worldwide databases).

Figure 1B:
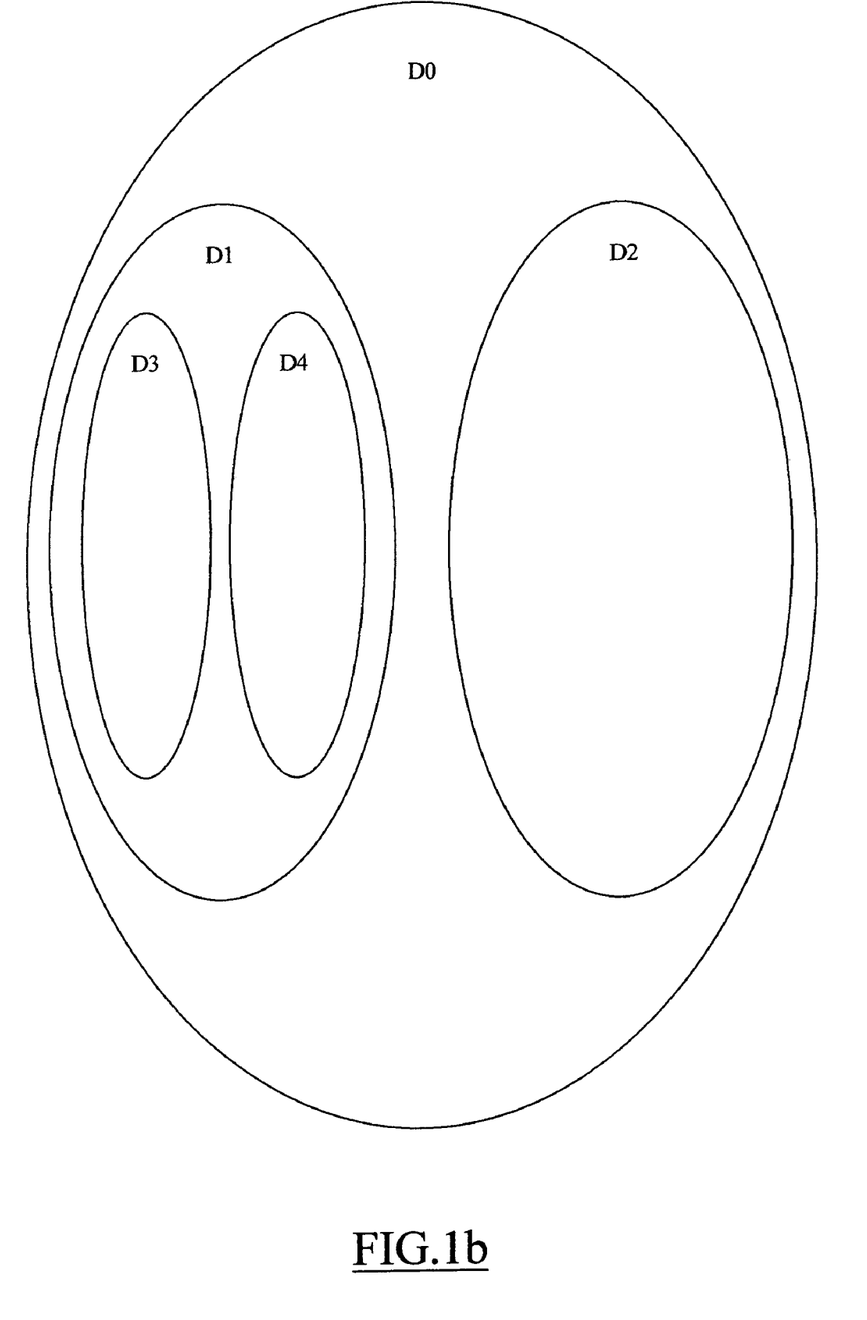
FIG. 1*b* represents the scope of the different resources of the system.

The scope of the different resources of the system is graphically represented in FIG. 1$b$. For example, each client in the domain D3 can access its local resources and the global resources of the corresponding domain D3; moreover, that client can also access the resources of the (parent) domains D1 and D0.

Different tasks running on the nodes of the system compete for accessing the resources in mutual exclusion. Each task is allowed to hold onto some resources while waiting for other resources (in other words, the access to all the resources that are needed for the execution of the task must not be granted at the same time in a single indivisible action). However, once a resource has been allocated to a task it cannot be preempted.

As described in detail in the following, the allocation of the resources is managed in a decentralized way; particularly, each client controls the allocation of the corresponding local resources and each domain manager controls the allocation of the global resources of its domain. A set of one or more resources, being requested by a task running on a generic client, is allocated with a progressive policy. More specifically, a first node in the corresponding path (i.e., the client itself or the master domain manager) allocates the associated resources as soon as they are all available; this event enables a next node in the path (between the client and the master domain manager) to perform the same operations, and so on until a last node in the path. The allocation of the corresponding resources by the last node enables execution of the task.

This algorithm automatically prevents the most common critical conditions in the system. Particularly, two tasks cannot prevent each other from proceeding because of a contention on a pair of resources that are defined on the same node (since the required resources are allocated to each task only when they are all available). Likewise, if a first resource on a node is allocated to a first task waiting for a second resource on a next node, it is impossible that the second resource be allocated to a second task waiting for the first resource; indeed, this implies that the second task has already been granted access to the required resources on the previous node.

Similar considerations apply if the system has another architecture (for example, based on a LAN), or if the tree includes a different number of levels and/or nodes; alternatively, some domains have no clients and/or resources (which are controlled by the corresponding domain manager directly), or the resources have different constraints (for example, some resources may be allocated to two or more tasks at the same time).

Figure 1C:
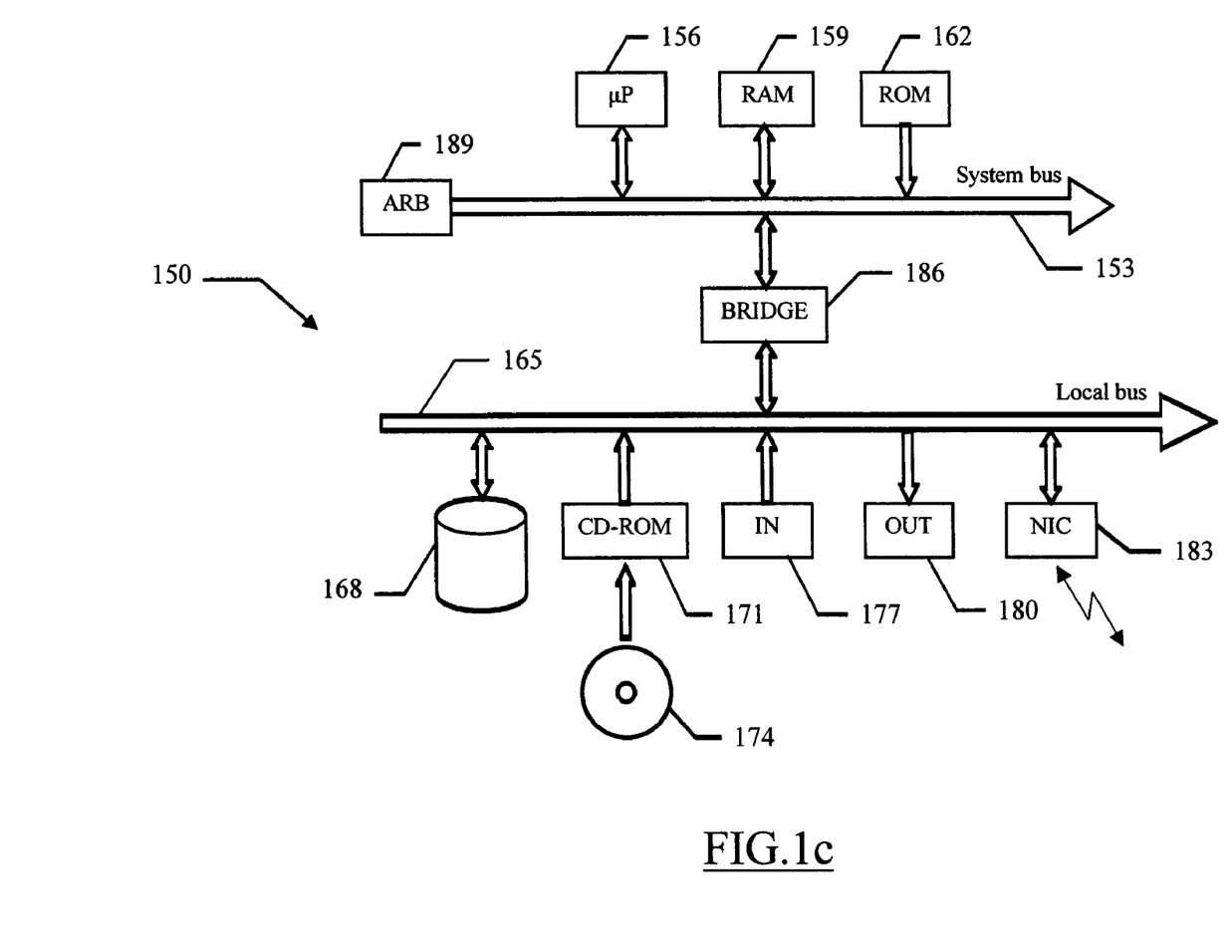
FIG. 1*c* shows the functional blocks of a generic computer of the system.

Moving to FIG. 1$c$, a generic computer of the above-described system is denoted with 150. The computer 150 is formed by several units that are connected in parallel to a system bus 153. In detail, one or more microprocessors (μP) 156 control operation of the computer 150; a RAM 159 (typically consisting of interleaved modules) is directly used as a shared working memory by the microprocessors 156, and a ROM 162 stores basic code for a bootstrap of the computer 150. Peripheral units are clustered around a local bus 165 (by means of respective interfaces). Particularly, a mass memory consists of one or more hard-disks 168 and drives 171 for reading CD-ROMs 174. Moreover, the computer 150 includes input devices 177 (for example, a keyboard and a mouse), and output devices 180 (for example, a monitor and a printer). A network Interface Card (NIC) 183 is used to connect the computer 150 to the INTERNET. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153.

Similar considerations apply if each computer has another architecture or includes different units; moreover, the computer can be replaced with a Personal Digital Assistant (PDA), a mobile telephone, or any other data processing entity.

Figure 2:
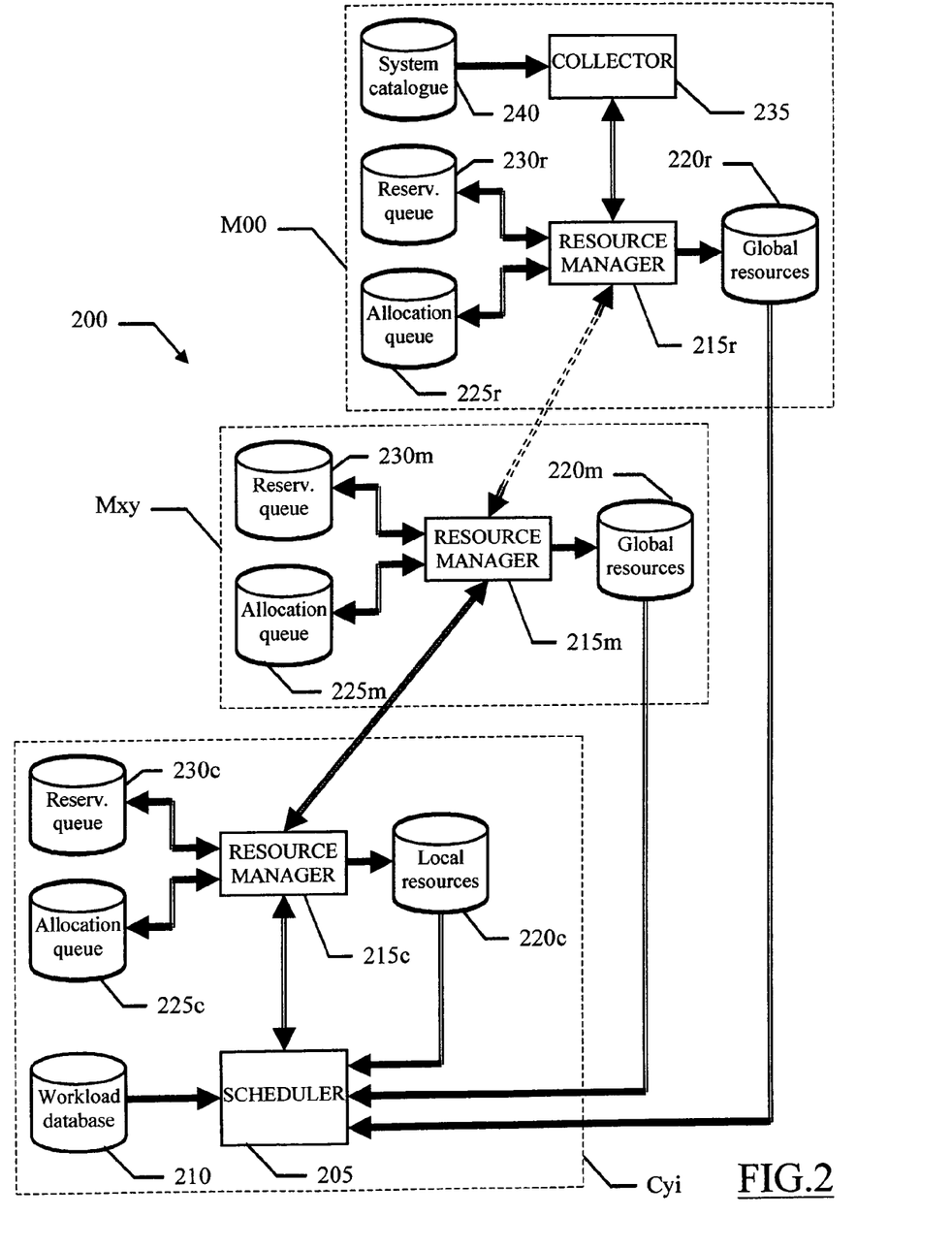
FIG. 2 depicts the main software components that can be used for practicing the method according to an embodiment of the invention.

Considering now FIG. 2, the main software components (denoted as a whole with 200) that can be used for implementing the method according to an embodiment of the present invention are illustrated. The information (programs and data) is typically stored on the different hard-disks and loaded (at least partially) into the corresponding working memories when the programs are running. The programs are initially installed onto the hard-disks from CD-ROMs.

A generic client Cyi runs a scheduler 205, which is used to submit jobs for execution according to a predefined plan; typically, the jobs consist of non-interactive applications in a batch processing (such as payroll programs, cost analysis programs, and the like). For this purpose, the scheduler 205 accesses a workload database 210; the workload database 210 stores information about the different jobs to be executed; for example, for each job the workload database 210 includes a description of the corresponding steps, an estimated duration, a planned time of execution, and any dependency from other jobs.

Whenever a job is submitted, the scheduler 205 requests the corresponding (local and/or global) resources that are needed for its execution to a resource manager 215c. The resource manager 215c directly controls the allocation of local resources 220c that are defined on the same client Cyi. For this purpose, the resource manager 215c exploits one (or more) allocation queue 225c for the jobs that are already enabled (as described in detail in the following); the allocation queue 225c is used to implement the scheduling policy that is supported by the resource manager 215c (for example, based on a round robin algorithm). Moreover, an indication of all the local resources being requested by the jobs that are not enabled yet is stored into one (or more) reservation queue 230c; the reservation queue 230c is used by the resource manager 215c to optimize the allocation of the local resources 220c (for example, according to forecast algorithms).

The resource manager 215c forwards the request (for the resources that are needed to the job) to a corresponding module 215m, which is installed on its domain manager Mxy. The resource manager 215m likewise controls the allocation of global resources 220m (which are defined in the corresponding domain Dy). The resource manager 215m exploits an allocation queue 225m for the enabled jobs, and a reservation queue 230m for the non-enabled jobs (being submitted on the domain manager Mxy, the clients Cyi of its domain Dy, or the nodes of the dependent domains).

The same structure described above is repeated for all the domain managers of the system, up to the master domain manager M00. Particularly, the master domain manager M00 includes a resource manager 215r controlling the allocation of corresponding global resources 220r; the resource manager 215r exploits an allocation queue 225r and a reservation queue 230r (for all the jobs that have been submitted on the system).

The resource manager 215r also interfaces with a module 235, which collects information about the status of the system (including the running conditions of the submitted jobs and the allocation conditions of all the resources). The status information is stored into a system catalogue 240 (for example, for monitoring purposes).

Similar considerations apply if the programs and the corresponding data are structured in a different way, or if the programs are distributed on any other computer readable medium (such as a DVD). In any case, the concepts of the present invention are also applicable when the scheduler is installed on one or more domain managers, or when the allocation queue, the reservation queue and/or the system catalogue are replaced with equivalent memory structures; alternatively, the scheduler submits other tasks, the system supports different resources, or more generally the method is used for allocating any type of resources that have been requested by generic operations.

Figure 3A:
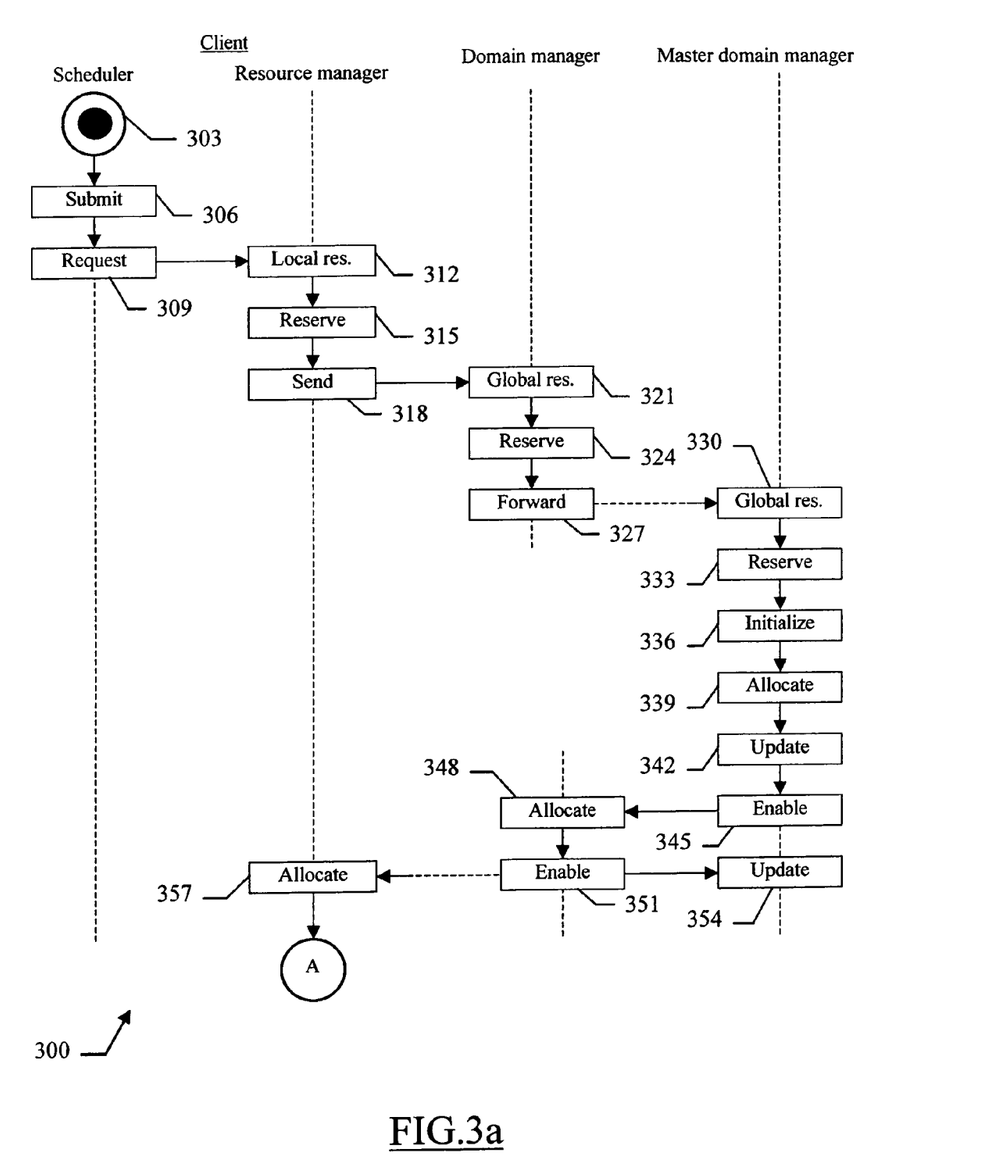
FIGS. 3*a*-3*b* show the flow of activity relating to the implementation of an embodiment of the invention.
Figure 3B:
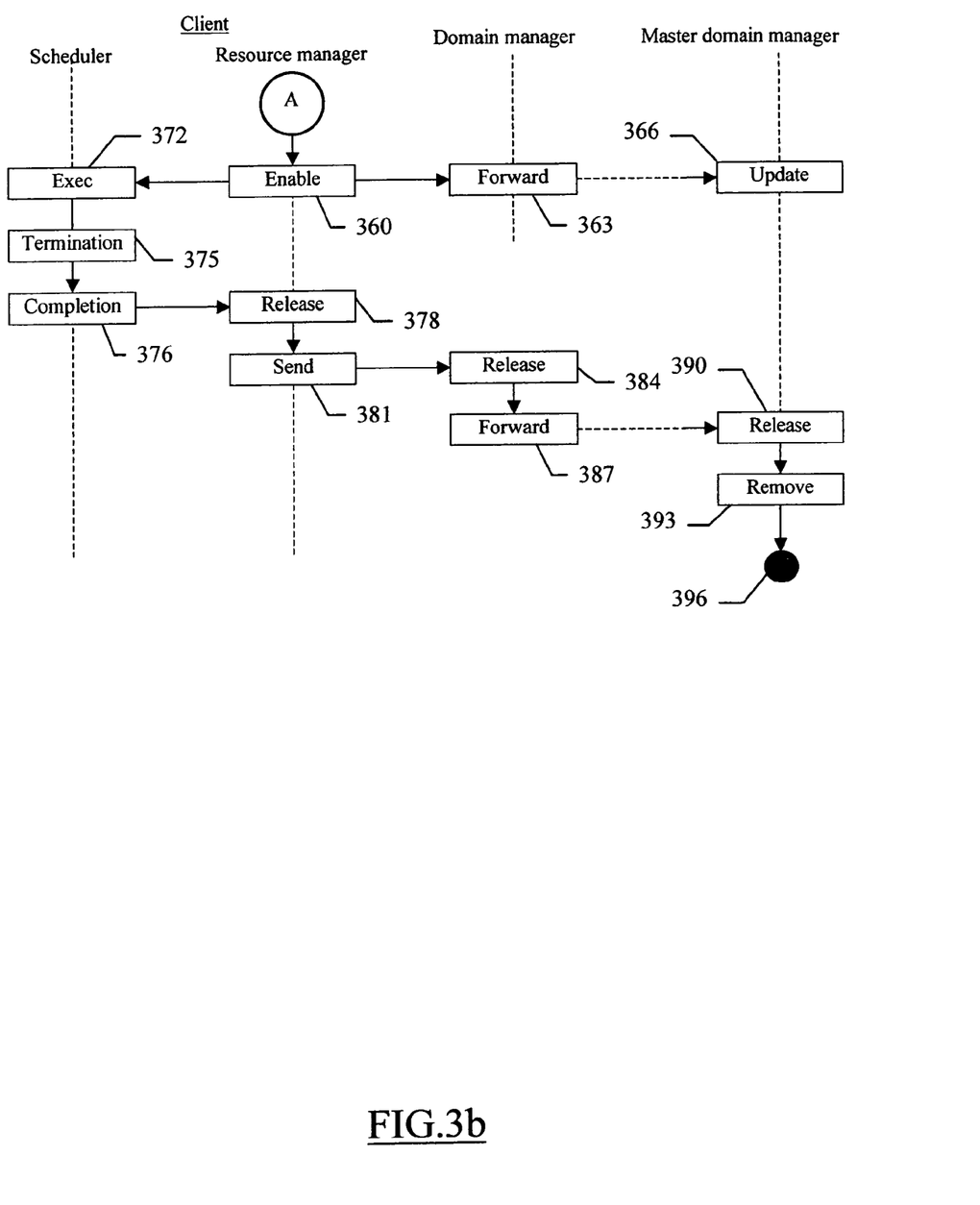

Referring now to FIGS. 3a-3b, the flow of activity of a method 300 implementing an embodiment of the present invention is illustrated. In this case, the resources for each job are allocated in a top-down order (i.e., from the master resource manager to the client where the job has been submitted).

More in detail, the method begins at the black start circle 303 in the swim-lane of the scheduler of a generic client, and then passes to block 306 wherein a selected job is submitted for execution. Proceeding to block 309, the scheduler builds a request message, which includes an identifier of the job and an indication of the resources that are needed for its execution; the request message is then passed to the corresponding resource manager.

In response thereto, the resource manager of the client at block 312 identifies the local resources that are listed in the request message. Those local resources (being controlled by the resource manager directly) are added to the corresponding reservation queue at block 315 (if any); the resource manager then suspends the processing of the job, waiting for an authorization to proceed. Continuing to block 318, the request message is sent to the parent node of the client (i.e., its domain manager).

Likewise, the resource manager of this node at block 321 identifies the global resources (being listed in the request message) that are under its control. Those global resources (if any) are added to the corresponding reservation queue at block 324 (with the processing of the job that is then suspended). Continuing to block 327, the request message is forwarded to its parent node. The same operations are repeated for each node in the path towards the master domain manager.

When the request message is received by the master domain manager, the corresponding global resources (listed in the request message) are identified at block 330. Those global resources (if any) are added to the reservation queue at block 333. The method then proceeds to block 336, wherein a new entry for the job is added to the system catalogue and it is initialized to indicate a suspended condition of the job.

Descending into block 339, the resource manager enters a waiting condition for the corresponding global resources being requested by the job. Particularly, if the master domain manager controls one or more global resources for the job (as indicated in the reservation queue), the resource manager waits for their availability; as soon as all those global resources are available, the resource manager locks and allocates them to the job (deleting their indication from the reservation queue at the same time). Conversely, if the master domain manager does not control any global resource for the job, the process continues without performing any operation. In both cases, the system catalogue is updated accordingly at block 342. Proceeding to block 345, the resource manager sends an enabling message (including the identifier of the job) to its child node in the path towards the client where the job has been submitted.

In response thereto, the resource manager of the child node at block 348 enters a waiting condition for the corresponding global resources being requested by the job. Even in this case, if the domain manager controls one or more global resources for the job (as indicated in the reservation queue), the resource manager waits for their availability; as soon as all those global resources are available, the resource manager locks and allocates them to the job (deleting their indication from the reservation queue). Conversely, if the domain manager does not control any global resource for the job, the process continues without performing any operation. In both cases, the enabling message is returned to the master domain manager at block 351. As a consequence, the system catalogue is updated accordingly at block 354. At the same time, the enabling message is also forwarded (at block 351) to the next child node in the path. The same operations are repeated for each node towards the client.

When the enabling message is received by the client, its resource manager at block 357 likewise enters a waiting condition for the corresponding local resources being requested by the job. If the job has requested one or more local resources (as indicated in the reservation queue), the resource manager waits for their availability; as soon as all those local resources are available, the resource manager locks and allocates them to the job (deleting their indication from the reservation queue). Conversely, if the job has not requested any local resource, the process continues without performing any operation. In both cases, the enabling message is returned at block 360 to the domain manager of the client. The enabling message is then forwarded at block 363 to its parent node; the same operations are repeated for each node in the path towards the master domain manager. When the enabling message is received by the master domain manager, the system catalogue is updated accordingly at block 366 (to indicate that the job can now be launched). At the same time, the resource manager of the client (at block 360) enables the execution of the job.

In response thereto, the scheduler at block 372 launches the execution of the job. The job terminates its execution at block 375 (because either all its steps have been completed or an error condition has been entered). The scheduler then builds and passes a corresponding completion message (including the identifier of the job) to its resource manager at block 376.

As a consequence, the resource manager of the client at block 378 releases the local resources (if any) that are allocated to the job (as indicated in the completion message). The completion message is then sent at block 381 to the domain manager of the client. Likewise, the resource manager of this node at block 384 releases the corresponding global resources (if any) that are allocated to the job. The completion message is then forwarded to its parent node at block 387. The same operations are repeated for each node in the path towards the master domain manager. When the completion message is received by the master domain manager, the corresponding global resources (if any) that are allocated to the job are released at block 390. The method proceeds to block 393, wherein the entry for the job in the system catalogue is removed. The method then ends at the concentric white/black stop circles 396.

Figure 4A:
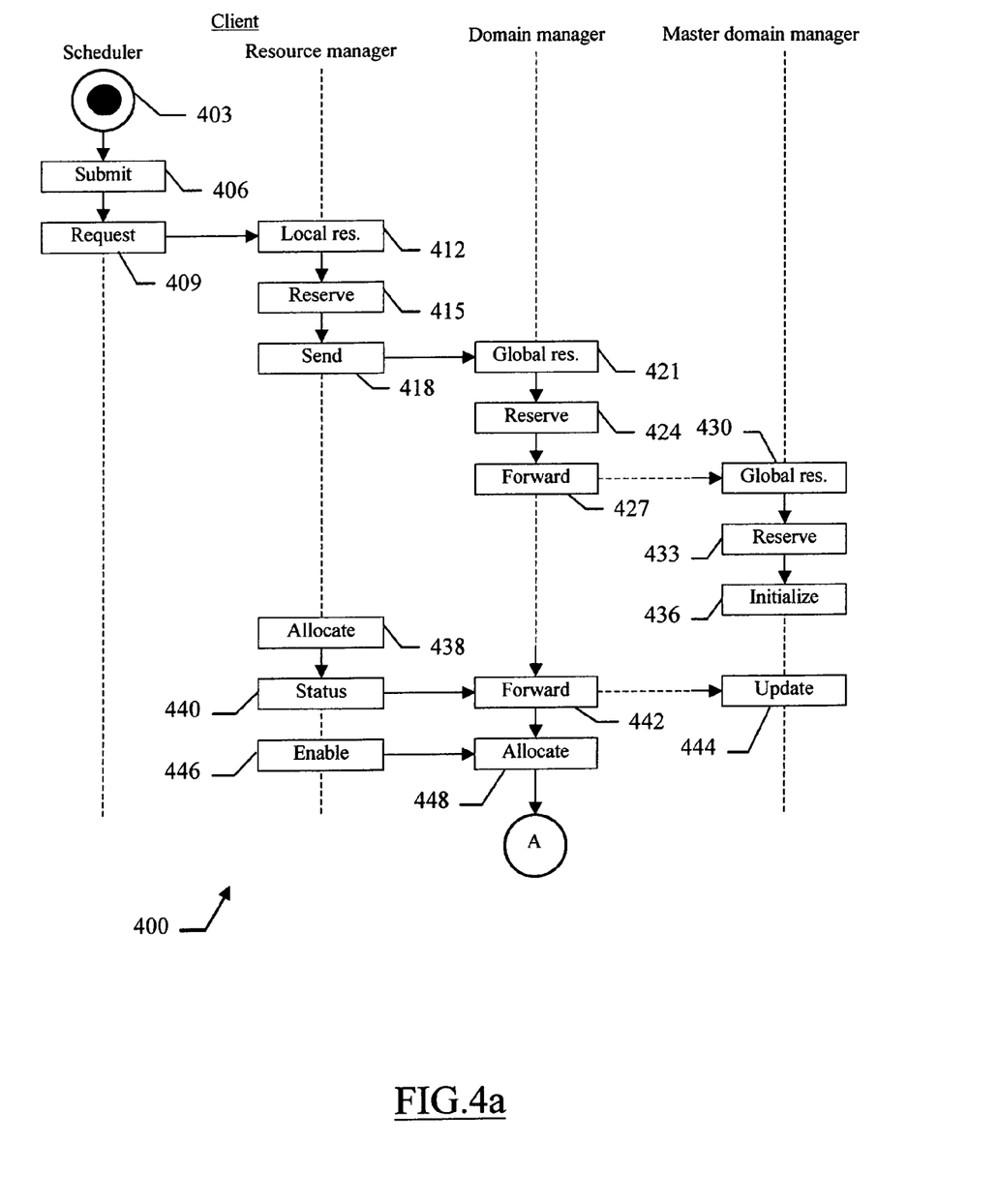
FIGS. 4*a*-4*b* show the flow of activity relating to a different embodiment of the invention.
Figure 4B:
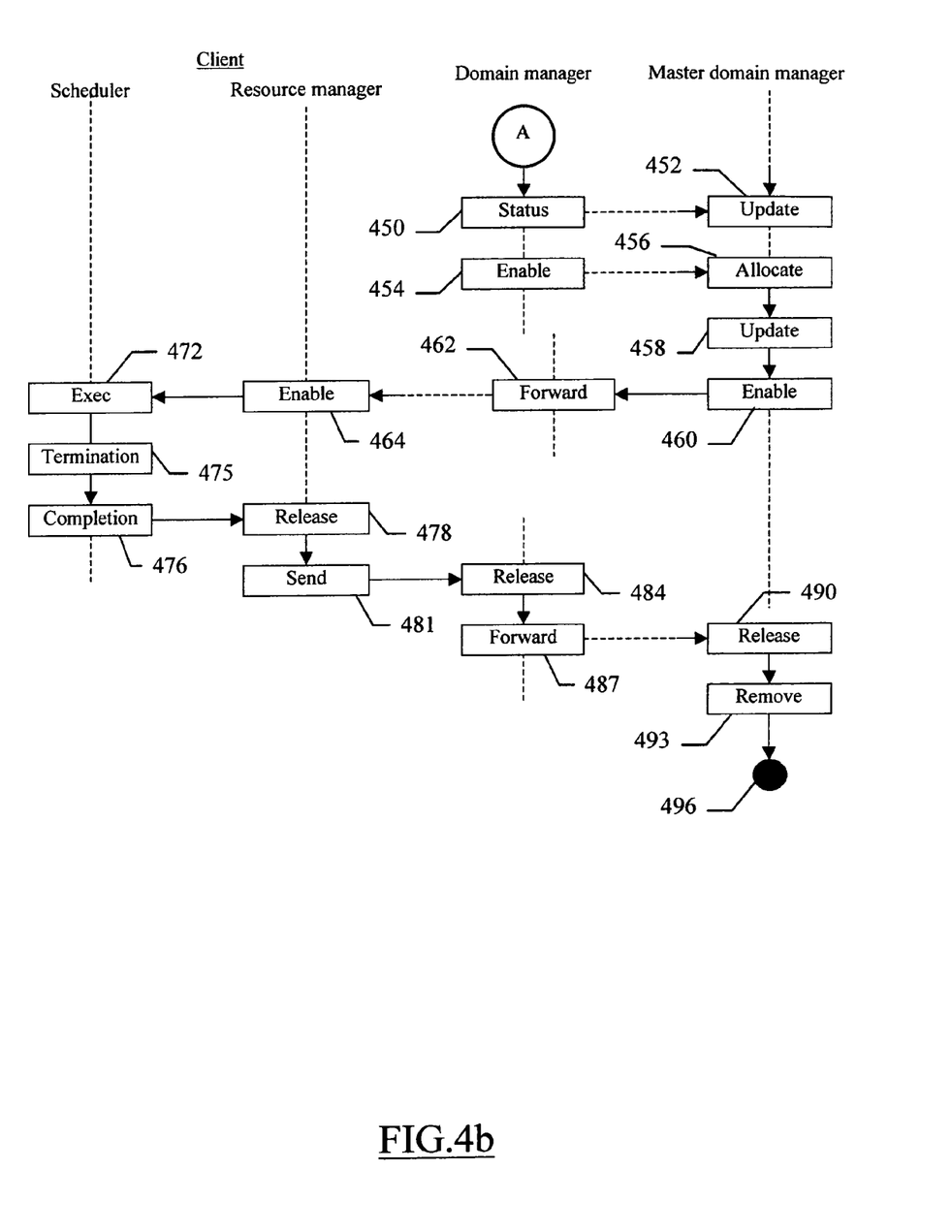

In an alternative embodiment of the present invention, the allocation of the resources that have been requested by the job is carried out in the opposite order (i.e., from the client to the master domain manager). As shown in FIGS. 4a-4b, a corresponding method 400 begins at the black start circle 403; the same operations described above (with reference to blocks 306-336) are then performed at blocks 406-436 for notifying the request message to the master domain manager.

Meanwhile, the resource manager of the client at block 438 allocates the local resources that have been requested by the job (if any) as soon as they are all available. A status message (including the identifier of the job) is then sent to the corresponding domain manager at block 440. The resource manager of this node at block 442 forwards the status message to its parent node. The same operations are repeated for each node in the path towards the master domain manager. When the status message is received by the master domain manager, the system catalogue is updated accordingly at block 444.

At the same time, the resource manager of the client at block 446 also sends an enabling message (including the identifier of the job) to the same domain manager. In response thereto, the resource manager of this node at block 448 allocates the global resources that have been requested by the job (if any) as soon as they are all available. A further status message is then sent at block 450 to its parent node and then forwarded in the path towards the master domain manager. When the status message is received by the master domain manager, the system catalogue is updated accordingly at block 452. At the same time, a further enabling message is sent at block 454 to that parent node. The same operations are then repeated for each node in the path towards the master domain manager.

When the enabling message is received by the master domain manager, the corresponding resource manager at block 456 allocates the global resources that have been requested by the job (if any) as soon as they are all available. The system catalogue is then updated accordingly at block 458. Continuing to block 460, the master domain manager sends an enabling message for the job to its child node in the path towards the client. The enabling message is forwarded to the next child node in the path at block 462; the same operations are repeated for each node in the path towards the client.

When the enabling message is received by the client, the corresponding resource manager at block 464 enables the execution of the job. In response thereto, the same operations described above (with reference to blocks 372-396) are performed at blocks 472-496 for executing the job and releasing the corresponding resources after its termination.

Similar considerations apply if equivalent methods are envisaged or if additional functions are provided. Alternatively, different information is transmitted or the nodes communicate in another way; for example, each node can flag or remove the corresponding resources being listed in the request message (before forwarding it to the next node in the path).

More generally, an aspect of the present invention proposes a method of allocating resources in a hierarchical data processing system. The system includes a plurality of nodes arranged in a tree; each resource is controlled by a corresponding node. The method starts with the step of submitting a request of execution of an operation. The operation requires a set of selected resources; each selected resource is controlled by a node in an ordered path. Execution of the operation is enabled in response to the allocation of all the selected resources; in the method of the invention, the selected resources controlled by each node in the path are allocated only when all the selected resources controlled by each previous node in the path have been allocated.

In the proposed solution, the allocation of the resources of the system is managed with a decentralized policy; for example, most requests can be resolved in the same site, such as a branch office or a department (with a reduced involvement or no involvement at all of higher level entities).

In this way, the workload relating to the allocation of the resources of the system is distributed across multiple nodes; as a result, the performance of the system is strongly improved.

Particularly, the devised architecture increases the fault tolerance of the system; indeed, any failure on a node only affects the corresponding sub-tree without interfering with operation of the other nodes of the system.

The method according to the present invention also reduces the overhead of a corresponding communication infrastructure.

Moreover, the proposed solution facilitates the prevention of critical conditions in the system; therefore, the complexity of the modules that manage the resources on the different nodes is strongly reduced.

The preferred embodiment of the invention described above offers further advantages.

Particularly, the resources of each node are allocated only when they are all available.

This choice automatically prevents the most common critical conditions in the system.

In a first implementation, the allocation of the resources is performed in a top-down order (with each node that allocates the corresponding resources, if any, and then enables its child node in the path).

The proposed solution is very simple and modular; moreover, the selected strategy avoids locking low level resources (such as local resources defined on the client) while waiting for high-level resources (such as global resources defined on the master domain manager).

Alternatively, the resources are allocated in the opposite order (i.e., from the client to the master domain manager).

Conversely, in this strategy the resources of high level (that are potentially shared among many jobs) are locked for the shortest possible time.

In any case, the present invention can be implemented even allocating the resources individually as soon as they are available, or with different allocation strategies (for example, dynamically mixing the approaches described above according to the characteristics of the jobs and/or the resources); moreover, the proposed method is also suitable to be implemented only involving the nodes in the path where at least one requested resource is defined (with the other nodes that are skipped).

A way to further improve the solution is to store an indication of the corresponding requested resources on each node.

This additional feature allows optimizing the allocation of the resources on each node.

As a further enhancement, the allocation of the corresponding resources on each node and the termination of the job are notified to the master resource manager, which updates a status structure (indicative of the status of all the resources of the system) accordingly.

In this way, the master resource manager provides a single central point of control for all the resources.

Preferably, when the execution of the job terminates the corresponding resources are released by forwarding a completion message along the path.

The devised solution is very simple but effective.

In any case, the present invention is also suitable to be implemented without providing any information (about the resources that will be requested) to the nodes in advance; for example, the request message is sent to the master domain manager directly when the allocation starts from this node or no message is forwarded to the master domain manager at the beginning when the allocation starts from the client. Alternatively, no status information is collected on the master domain manager, or the resources are released in a different way (for example, sending a completion message including a list of the allocated resources).

Advantageously, the devised solution is implemented with a computer program, which is provided as a corresponding product embodied in a suitable medium.

Alternatively, the program is pre-loaded onto the harddisks, is sent to the computers through the INTERNET, is broadcast, or more generally is provided in any other form directly loadable into the working memories of the computers. However, the method according to the present invention leads itself to be carried out with a hardware structure (for example, integrated in chips of semiconductor material), or with a combination of software and hardware.

Moreover, it should be noted that the same program can be replicated on the different nodes of the system (with each instance of the program that is configured according to the role of the corresponding node, i.e., client, domain manager or master domain manager).

In any case, the provision of three different modules (each one for the corresponding types of nodes) is not excluded.

Naturally, in order to satisfy local and specific requirements, a person skilled in the art may apply to the solution described above many modifications and alterations all of which, however, are included within the scope of protection of the invention as defined by the following claims

The invention claimed is:

1. A method of allocating resources in a hierarchical distributed data processing system comprising:
representing, in a tree corresponding to the hierarchical data processing system, a plurality of data processing systems, each of the plurality of data processing systems forming a node in the tree, and each resource in the hierarchical distributed data processing system being controlled by a corresponding node;
submitting at a node data processing system a request of execution of an operation requiring a set of selected resources, each selected resource being controlled by a node in an ordered path in the tree, a selected resource at a node in the tree being one of (i) a local resource of the node in the tree if the node in the tree can allocate the selected resource, and (ii) a global resource if a parent node of the node in the tree can allocate the selected resource for use by an operation at the node in the tree;
maintaining an allocation queue and a reservation queue at the node in the tree, the allocation queue containing information of a resource allocated to a job that is enabled, the reservation queue containing information of a second resource being requested by a second job that is not enabled;
recording, responsive to the request, information of a subset of the selected resources in the reservation queue at the node in the ordered path;
allocating the subset of the selected resources at the node in the ordered path, the allocating causing the information of the subset of the selected resources to be (i) deleted from the reservation queue and (ii) recorded in the allocation queue of the node in the ordered path; and
enabling execution of the operation in response to the allocation of all the selected resources, the selected resources controlled by each node in the ordered path being allocated only when all the selected resources controlled by each previous node in the ordered path have been allocated.

2. The method according to claim 1, further including the step of:
each node in the ordered path allocating each corresponding selected resource in response to the availability of all selected resources that correspond to that node.

3. The method according to claim 1, wherein the request is submitted on a source node and the ordered path is from a root node of the tree to the source node, the method further including the steps of:
the source node notifying the request to the root node;
the root node allocating those selected resources if any that correspond to the root node and sending an enabling message to a child node in the ordered path in response to the request;
each intermediate node in the path between the root node and the source node allocating those selected resources if any that correspond to that intermediate node and sending a further enabling message to a further child node in the ordered path in response to the enabling message; and the source node allocating those selected resources if any that correspond to the source node and enabling execution of the operation in response to the further enabling message.

4. The method according to claim 1, wherein the request is submitted on a source node and the ordered path is from the source node to a root node of the tree, the method further including the steps of:

the source node allocating those selected resources if any that correspond to the source node and sending an enabling message to a parent node in response to the request;

each intermediate node in the ordered path between the source node and the root node allocating those selected resources if any that correspond to that intermediate node and sending a further enabling message to a further parent node in response to the enabling message;

the root node allocating those selected resources if any that correspond to the root node and sending a still further enabling message to the source node in response to the further enabling message; and the source node enabling execution of the operation in response to the still further enabling message.

5. The method according to claim 3, further including the steps of:

the source node storing an indication of each selected resource that corresponds to the source node and sending a request message indicative of the selected resources to the next node in response to the request;

each intermediate node storing an indication of each selected resource that corresponds to that intermediate node and forwarding the request message to the next node in response to the request message; and the root node storing an indication of each selected resource that corresponds to the root node in response to the request message.

6. The method according to claim 4, further including the steps of:

the source node storing an indication of each selected resource that corresponds to the source node and sending a request message indicative of the selected resources to the next node in response to the request;

each intermediate node storing an indication of each selected resource that corresponds to that intermediate node and forwarding the request message to the next node in response to the request message; and the root node storing an indication of each selected resource that corresponds to the root node in response to the request message.

7. The method according to claim 3, further including the steps of:

the root node updating a status structure indicative of a status of all the resources of the distributed hierarchical data processing system in response to the allocation of the selected resources that correspond to the root node;

each node in the ordered path different from the root node sending a status message to the root node in response to the allocation of the selected resources that correspond to that node;

the root node updating the status structure in response to each status message; and the root node updating the status structure in response to a completion of the operation.

8. The method according to claim 4, further including the steps of:

the root node updating a status structure indicative of a status of all the resources of the distributed hierarchical data processing system in response to the allocation of the selected resources that correspond to the source node;

each node in the ordered path different from the root node sending a status message to the root node in response to the allocation of the selected resources that correspond to that node;

the root node updating the status structure in response to each status message; and the root node updating the status structure in response to a completion of the operation.

9. The method according to claim 7, further including the steps of:

the source node releasing each selected resource that corresponds to the source node and sending a completion message to the next node in response to the completion of the operation;

each intermediate node releasing each selected resource that corresponds to that intermediate node and forwarding the completion message to the next node in response to the completion message;

the root node releasing each selected resource that corresponds to the root node and updating the status structure in response to the completion message.

10. The method according to claim 8, further including the steps of:

the source node releasing each selected resource that corresponds to the source node and sending a completion message to the next node in response to the completion of the operation;

each intermediate node releasing each selected resource that corresponds to that intermediate node and forwarding the completion message to the next node in response to the completion message;

the root node releasing each selected resource that corresponds to the root node and updating the status structure in response to the completion message.

11. A program product in a computer readable storage medium embodying a computer program for use in a hierarchical distributed data processing system, the program including program code means directly loadable into a working memory of the system for performing a method of allocating resources when the program is run on the system, wherein the method includes the steps of:

representing, in a tree corresponding to the hierarchical data processing system, a plurality of data processing systems, each of the plurality of data processing systems forming a node in the tree, and each resource in the hierarchical distributed data processing system being controlled by a corresponding node;

submitting at a node data processing system a request of execution of an operation requiring a set of selected resources, each selected resource being controlled by a node in an ordered path in the tree, a selected resource at a node in the tree being one of (i) a local resource of the node in the tree if the node in the tree can allocate the selected resource, and (ii) a global resource if a parent node of the node in the tree can allocate the selected resource for use by an operation at the node in the tree;

maintaining an allocation queue and a reservation queue at the node in the tree, the allocation queue containing information of a resource allocated to a job that is enabled, the reservation queue containing information of a second resource being requested by a second job that is not enabled;

recording, responsive to the request, information of a subset of the selected resources in the reservation queue at the node in the ordered path;

allocating the subset of the selected resources at the node in the ordered path, the allocating causing the information of the subset of the selected resources to be (i) deleted from the reservation queue and (ii) recorded in the allocation queue of the node in the ordered path; and enabling execution of the operation in response to the allocation of all the selected resources, the selected resources controlled by each node in the ordered path being allocated only when all the selected resources controlled by each previous node in the ordered path have been allocated.

12. The product according to claim 11 wherein, the method further comprises:

allocating, responsive to the current node being the first node, each corresponding selected resource and enabling a next node in the path in response to the request and the availability of all the corresponding resources;

allocating, responsive to the current node being an intermediate node between the first node and the last node, each corresponding selected resource and enabling the next node in the path in response to the enabling and the availability of all the corresponding resources; and allocating, responsive to the current node being the last node, each corresponding selected resource and enabling execution of the operation in response to the enabling and the availability of all the corresponding resources.

13. A system for allocating resources in a hierarchical distributed data processing system, wherein the system comprises:

a storage device including a storage medium, wherein the storage device stores computer usable program code; and a processor, wherein the processor executes the computer usable program code, and wherein the computer usable program code comprises:

computer usable code for representing, in a tree corresponding to the hierarchical data processing system, a plurality of data processing systems, each of the plurality of data processing systems forming a node in the tree, and each resource in the hierarchical distributed data processing system being controlled by a corresponding node;

computer usable code for a scheduler configured to submit a request of execution of an operation requiring a set of selected resources, each selected resource being controlled by a node in an ordered path in the tree, a selected resource at a node in the tree being one of (i) a local resource of the node in the tree if the node in the tree can allocate the selected resource, and (ii) a global resource if a parent node of the node in the tree can allocate the selected resource for use by an operation at the node in the tree;

computer usable code for maintaining an allocation queue and a reservation queue at the node in the tree, the allocation queue containing information of a resource allocated to a job that is enabled, the reservation queue containing information of a second resource being requested by a second job that is not enabled;

computer usable code for recording, responsive to the request, information of a subset of the selected resources in the reservation queue at the node in the ordered path;

computer usable code for allocating the subset of the selected resources at the node in the ordered path, the allocating causing the information of the subset of the selected resources to be (i) deleted from the reservation queue and (ii) recorded in the allocation queue of the node in the ordered path; and computer usable code for a resource manager on each node configured to enable execution of the operation in response to the allocation of all the selected resources, the selected resources controlled by each node in the ordered path being allocated only when all the selected resources controlled by each previous node in the ordered path have been allocated.

14. The method of claim 1, wherein a resource is associated with a constraint, the constraint allowing the resource to be assigned to more than one operation simultaneously.

15. The method of claim 1, wherein, for a node other than the root in the ordered path, allocating the subset of the selected resources at the node in the ordered path occurs only when a previous node in the ordered path has allocated a second subset of the selected resources by recording information of the second subset of the selected resources in the allocation queue of that previous node in the ordered path.

16. The product according to claim 11, further including the step of:

each node in the ordered path allocating each corresponding selected resource in response to the availability of all selected resources that correspond to that node.

17. The product according to claim 11, wherein the request is submitted on a source node and the ordered path is from a root node of the tree to the source node, the method further including the steps of:

the source node notifying the request to the root node;

the root node allocating those selected resources if any that correspond to the root node and sending an enabling message to a child node in the ordered path in response to the request;

each intermediate node in the path between the root node and the source node allocating those selected resources if any that correspond to that intermediate node and sending a further enabling message to a further child node in the ordered path in response to the enabling message; and the source node allocating those selected resources if any that correspond to the source node and enabling execution of the operation in response to the further enabling message.

18. The product according to claim 11, wherein the request is submitted on a source node and the ordered path is from the source node to a root node of the tree, the method further including the steps of:

the source node allocating those selected resources if any that correspond to the source node and sending an enabling message to a parent node in response to the request;

each intermediate node in the ordered path between the source node and the root node allocating those selected resources if any that correspond to that intermediate node and sending a further enabling message to a further parent node in response to the enabling message;

the root node allocating those selected resources if any that correspond to the root node and sending a still further enabling message to the source node in response to the further enabling message; and the source node enabling execution of the operation in response to the still further enabling message.

19. The product according to claim 17, further including the steps of:
- the source node storing an indication of each selected resource that corresponds to the source node and sending a request message indicative of the selected resources to the next node in response to the request;
- each intermediate node storing an indication of each selected resource that corresponds to that intermediate node and forwarding the request message to the next node in response to the request message; and
- the root node storing an indication of each selected resource that corresponds to the root node in response to the request message.

20. The product according to claim 18, further including the steps of:
- the source node storing an indication of each selected resource that corresponds to the source node and sending a request message indicative of the selected resources to the next node in response to the request;
- each intermediate node storing an indication of each selected resource that corresponds to that intermediate node and forwarding the request message to the next node in response to the request message; and
- the root node storing an indication of each selected resource that corresponds to the root node in response to the request message.

* * * * *